United States Patent
Wang et al.

(10) Patent No.: US 12,481,622 B2
(45) Date of Patent: Nov. 25, 2025

(54) DATA PROCESSING METHOD AND APPARATUS, COMPUTER DEVICE AND STORAGE MEDIUM

(71) Applicant: BEIJING BYTEDANCE NETWORK TECHNOLOGY CO., LTD., Beijing (CN)

(72) Inventors: Zhe Wang, Beijing (CN); Qian Zhou, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/722,536

(22) PCT Filed: Apr. 4, 2023

(86) PCT No.: PCT/CN2023/086059
§ 371 (c)(1),
(2) Date: Jun. 20, 2024

(87) PCT Pub. No.: WO2023/197904
PCT Pub. Date: Oct. 19, 2023

(65) Prior Publication Data
US 2025/0068591 A1   Feb. 27, 2025

(30) Foreign Application Priority Data
Apr. 13, 2022   (CN) .......................... 202210384525.4

(51) Int. Cl.
*G06F 16/14*   (2019.01)
*G06F 16/16*   (2019.01)

(52) U.S. Cl.
CPC ............ *G06F 16/148* (2019.01); *G06F 16/16* (2019.01)

(58) Field of Classification Search
CPC ............................... G06F 16/148; G06F 16/16
(Continued)

(56) References Cited

U.S. PATENT DOCUMENTS

| | | | | |
|---|---|---|---|---|
| 8,214,363 B2 * | 7/2012 | Chaudhary | ........... | G06F 16/953 707/769 |
| 8,694,503 B1 * | 4/2014 | Naga | ..................... | G06F 16/128 707/736 |

(Continued)

FOREIGN PATENT DOCUMENTS

| | | |
|---|---|---|
| CN | 106156271 A | 11/2016 |
| CN | 106294352 A | 1/2017 |

(Continued)

OTHER PUBLICATIONS

International Patent Application No. PCT/CN2023/086059; Int'l Search Report; dated May 22, 2023; 3 pages.

(Continued)

*Primary Examiner* — Giovanna B Colan
(74) *Attorney, Agent, or Firm* — BakerHostetler

(57) ABSTRACT

The present disclosure provides a data processing method and apparatus, a computer device and a storage medium. The method comprises: receiving a query instruction for data to be queried stored in a data file system; in response to the query instruction instructing to perform online query on the data, determining index information corresponding to the data, and querying the data in the data file system on the basis of the index information; and in response to the query instruction instructing to perform offline query on the data, determining address information of the data in the data file system on the basis of a keyword of the data, and querying the data in the data file system on the basis of the address information.

20 Claims, 2 Drawing Sheets

(58) Field of Classification Search
USPC .......................................................... 707/737
See application file for complete search history.

(56) References Cited

U.S. PATENT DOCUMENTS

| | | | | |
|---|---|---|---|---|
| 2009/0265328 A1* | 10/2009 | Parekh | .................. | G06F 16/334 |
| | | | | 707/999.005 |
| 2014/0156810 A1* | 6/2014 | Liu | ....................... | H04L 67/303 |
| | | | | 709/219 |
| 2015/0161176 A1* | 6/2015 | Majkowska | .......... | G06F 16/532 |
| | | | | 707/723 |
| 2016/0239487 A1* | 8/2016 | Potharaju | .......... | G06F 16/24578 |
| 2020/0379948 A1 | 12/2020 | Olderdissen | | |

FOREIGN PATENT DOCUMENTS

| | | | |
|---|---|---|---|
| CN | 110175174 | A | 8/2019 |
| CN | 112182043 | A | 1/2021 |
| CN | 112818016 | A | 5/2021 |
| CN | 113420051 | A | 9/2021 |
| CN | 113553327 | A | 10/2021 |
| CN | 114817151 | A | 7/2022 |

OTHER PUBLICATIONS

First Office Action for Chinese Application No. 202210384525.4, Mar. 29, 2025, 19 pages.

Wang D., et al., "A Method for Processing Massive Online Monitoring Data of Smart Substations," Electric Power Automation Equipment, Aug. 10, 2013 Vol. 33, No. 08, pp. 142-146. (English Abstract see p. 156).

* cited by examiner

DATA PROCESSING METHOD AND APPARATUS, COMPUTER DEVICE AND STORAGE MEDIUM

The application is a U.S. National Stage Application of PCT International Application No. PCT/CN2023/086059, filed on Apr. 4, 2023, which claims the priority from the CN patent application No. 202210384525.4 filed with the China National Intellectual Property Administration on Apr. 13, 2022, and entitled "DATA PROCESSING METHOD AND APPARATUS, COMPUTER DEVICE AND STORAGE MEDIUM," the disclosure of which are incorporated herein by reference in their entities.

FIELD

The present disclosure relates to computer technology field, and more specifically to a method, an apparatus, a computer device and a storage medium for data processing.

BACKGROUND

In scenarios where a large amount of data is queried, such as log data query, two different query modes are normally provided, including online real-time query and offline query. Under online and offline queries, two different storage systems are determined for the data, including a database to which data are written in real time for the online query and a database to which data are updated regularly for the offline query.

Since the timing for write of data into the database is different, data inconsistency may occur in the two databases respectively corresponding to the two query modes.

Accordingly, deviations may appear when data are queried in different modes and data query is thus inaccurate.

SUMMARY

Embodiments of the present disclosure at least provide a method, an apparatus, a computer device and a storage medium for data processing.

In one aspect, embodiments of the present disclosure provide a method for data processing, comprising: receiving a query instruction for data to be queried stored in a data file system; in response to the query instruction indicating an online query for the data to be queried, determining index information corresponding to the data to be queried and querying, based on the index information, the data to be queried in the data file system; in response to the query instruction indicating an offline query for the data to be queried, determining, based on keywords of the data to be queried, address information of the data to be queried in the data file system and querying, based on the address information, the data to be queried in the data file system.

In one optional implementation, the determining, based on keywords of the data to be queried, address information of the data to be queried in the data file system comprises: determining, based on the keywords of the data to be queried, address information of the data to be queried in an offline data table corresponding to the data file system; and the offline data table includes the keywords corresponding to the data to be queried, and the address information of the data to be queried in the data file system.

In one optional implementation, the determining index information corresponding to the data to be queried comprises: determining, based on the keywords of the data to be queried, index information corresponding to the data to be queried in a data index base corresponding to the data file system; wherein the data index base includes index information of the data to be queried, the index information of the data to be queried includes keywords of the data to be queried, and address information of the data to be queried in the data file system.

In one optional implementation, the data file system includes a plurality of storage data containing the data to be queried and each of the storage data has corresponding index information; before determining, based on keywords of the data to be queried, the index information corresponding to the data to be queried in the data index base, the method also comprises: grouping a plurality of pieces of the index information and updating, based on a plurality of pieces of index information groups obtained, the data index base; wherein the determining, based on keywords of the data to be queried, index information corresponding to the data to be queried in the data index base comprises: determining, based on the keywords, a target index information group from the plurality of index information groups and an index position of index information corresponding to the data to be queried in the target index information group; and determining, based on the index position, the index information of the data to be queried from the index information group.

In one optional implementation, obtaining the index information groups by grouping a plurality of pieces of the index information comprises: determining grouping keywords for the index information groups; determining, based on the grouping keywords, the target index information from a plurality of pieces of the index information; wherein the grouping keywords include keywords of the target index information; grouping the target index information to obtain the index information groups.

In one optional implementation, the querying, based on the index information, the data to be queried in the data file system comprises: querying, based on address information in the index information, the data to be queried in the data file system; the address information characterizes a relative storage position of the data to be queried in a target data block of the data file system, the target data block being located under a target file path in the data file system.

In one optional implementation, the keywords include at least one of: object information, type information, corresponding query scope under the type information and data identifier corresponding to the data to be queried.

In a second aspect, embodiments of the present disclosure also provide an apparatus for data processing, comprising: a receiving module for receiving a query instruction for data to be queried stored in a data file system; a first processing module for in response to the query instruction indicating an online query for the data to be queried, determining index information corresponding to the data to be queried and querying, based on the index information, the data to be queried in the data file system; a second processing module for in response to the query instruction indicating an offline query for the data to be queried, determining, based on keywords of the data to be queried, address information of the data to be queried in the data file system and querying, based on the address information, the data to be queried in the data file system.

In one optional implementation, while determining, based on keywords of the data to be queried, address information of the data to be queried in the data file system, the second processing module is used for: determining, based on keywords of the data to be queried, address information of the data to be queried in an offline data table corresponding to the data file system; the offline data table includes keywords corresponding to the data to be queried, and address information of the data to be queried in the data file system.

In one optional implementation, when determining index information corresponding to the data to be queried, the first processing module is used for: determining, based on keywords of the data to be queried, index information corresponding to the data to be queried in a data index base corresponding to the data file system; wherein the data index base includes index information of the data to be queried, the index information of the data to be queried includes keywords of the data to be queried, and address information of the data to be queried in the data file system.

In one optional implementation, the data file system includes a plurality of storage data containing the data to be queried and each of the storage data has corresponding index information; before determining, based on keywords of the data to be queried, index information corresponding to the data to be queried in the data index base, the first processing module is also used for: grouping a plurality of pieces of the index information and updating, based on a plurality of index information groups obtained, the data index base; wherein when determining, based on keywords of the data to be queried, index information corresponding to the data to be queried in the data index base, the first processing module is used for: determining, based on the keywords, a target index information group from the plurality of index information groups and an index position of index information corresponding to the data to be queried in the target index information group; determining, based on the index position, index information of the data to be queried from the index information group.

In one optional implementation, when obtaining the index information groups by grouping a plurality of pieces of the index information, the first processing module is used for: determining grouping keywords for the index information groups; determining, based on the grouping keywords, target index information from a plurality of pieces of the index information; wherein the grouping keywords include keywords of the target index information; grouping the target index information to obtain the index information groups.

In one optional implementation, when querying, based on the index information, the data to be queried in the data file system, the first processing module is used for: querying, based on address information in the index information, the data to be queried in the data file system; the address information characterizes a relative storage position of the data to be queried in a target data block of the data file system, the target data block being located under a target file path in the data file system.

In one optional implementation, the keywords include at least one of: object information, type information, corresponding query scope under the type information and data identifier corresponding to the data to be queried.

In a third aspect, optional implementations of the present disclosure also provide a computer device, comprising: a processor, a memory and a bus; wherein the memory stores machine-readable instructions executable by the processor; the processor is used to execute the machine-readable instructions stored in the memory; the machine-readable instructions, when executed by the processor, cause the processor to perform the above first aspect, or steps in any possible implementations according to the first aspect.

In a fourth aspect, optional implementations of the present disclosure further provide a computer-readable storage medium stored thereon with computer programs, the computer programs, when executed, performing the above first aspect, or steps in any possible implementations according to the first aspect.

In a fifth aspect, there is provided a computer program product comprising computer programs/instructions which, when executed by a processor, implement the above aspect or steps in any possible implementations according to the first aspect.

Effects of the above apparatus for data processing, computer device, computer-readable storage medium and computer program product may refer to the above explanation of the method for data processing and will not be covered here.

Embodiments of the present disclosure provide a method, an apparatus, a computer device and a storage medium for data processing. A same data file system for data storage is used by online query and offline query. To adapt online query and offline query to the same data file system, the query may be made in accordance with different information of the data to be queried under different query modes. For example, when the data to be queried is queried by an online query approach, the data to be queried is queried in the data file system by its corresponding index information; alternatively, if the data to be queried is queried by an offline query approach, address information of the data to be queried in the data file system is determined based on keywords of the data to be queried for query. Accordingly, as the online and offline query approaches adopt the same data file system, consistency between the results obtained under the two query modes is ensured, which further guarantees data query accuracy.

The above objectives, characteristics and advantages of the embodiments of the present disclosure will be more easily understood by listing the following preferred embodiments. Detailed description of the preferred embodiments is also provided below with reference to the accompanying drawings

BRIEF DESCRIPTION OF THE DRAWINGS

To describe the technical solutions in the embodiments of the present disclosure more clearly, the drawings to be used in the embodiments are briefly introduced below. The drawings here are incorporated into the description as a part of it. These drawings illustrate embodiments according to the present disclosure and further explain the technical solutions of the present disclosure in combination with the description. It is to be understood that the following drawings only illustrate some embodiments of the present disclosure and shall not be regarded as limitations over the scope. Those skilled in the art also may obtain other related drawings from the illustrated ones without any exercises of inventive work.

DETAILED DESCRIPTION OF EMBODIMENTS

Figure 1:
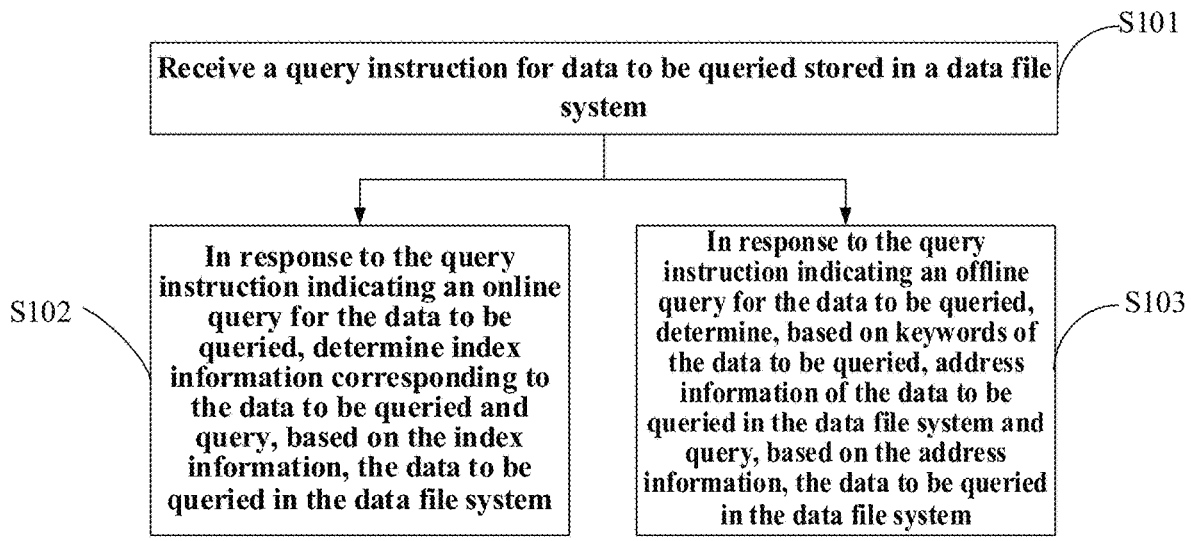
FIG. 1 illustrates a flowchart of a method for data processing provided by embodiments of the present disclosure.

For a clearer picture of the objectives, technical solutions and advantages of the embodiments of the present disclosure, the technical solutions in the embodiments of the present disclosure are to be described clearly and completely with reference to the drawings in the embodiments of the present disclosure. It is obvious that the described embodiments are only part of the embodiments of the present disclosure, rather than all of them. In general, components of the embodiments of the present disclosure described and illustrated here may be arranged and designed by various configurations. Thus, the following detailed description of the embodiments of the present disclosure provided in the drawings is not intended to restrict the protection scope of the present disclosure. It is merely a description of the selected embodiments of the present disclosure. All other embodiments obtained by those skilled in the art on the basis of the illustrated embodiments of the present disclosure without any exercises of inventive work fall within the protection scope of the present disclosure.

It is investigated by research that online query and offline query are two approaches provided in the scenarios for querying big data. The database used by the two different query approaches also varies. For online query, data may be written into a corresponding database that stores data in real time; as for offline query, a corresponding database that stores the data is updated by loading offline load data regularly. Since the timing for write of data into the database is different for the two approaches, data inconsistency may occur in the two databases upon data query. For example, if the newly generated data is not updated to the database used by offline query in time, deviations may appear between the results obtained by the online query and the offline query and data query is thus inaccurate.

Based on the above research, the present disclosure provides a method, an apparatus, a computer device and a storage medium for data processing. A same data file system for data storage is used by online query and offline query. To adapt online query and offline query to the same data file system, the query may be made in accordance with different information of the data to be queried under different query modes. For example, when the data to be queried is queried by an online query approach, the data to be queried is queried in the data file system by its corresponding index information; alternatively, if the data to be queried is queried by an offline query approach, address information of the data to be queried in the data file system is determined based on keywords of the data to be queried for query. Accordingly, as the online and offline query approaches adopt the same data file system, consistency between the results obtained under the two query modes is ensured, which further guarantees data query accuracy.

Defects in the above solutions are discovered by inventors through practice and careful research. In such case, the process of discovering the above problems and the solutions to the problems proposed by the present disclosure below should be considered as contributions of the inventors to the present disclosure.

It is to be noted: similar reference signs and letters indicate similar items in the following drawings. Therefore, once an item is defined in a drawing, no further definitions and explanations are required in the subsequent drawings.

To easily understand this embodiment, a method for data processing disclosed by embodiments of the present disclosure is first introduced in details. The method for data processing provided by embodiments of the present disclosure is generally executed by a computer device with certain computing power. The computer device, for example, includes: terminal device, or server or other processing devices. The terminal device may be a User Equipment, a mobile device, a user terminal, terminal, a cellular phone, a cordless telephone, a Personal Digital Assistant (PDA), a hand-held device, a computing device, an on-board device and a wearable device etc. In some possible implementations, the method for data processing may be implemented by calling computer-readable instructions stored in the memory through a processor.

The method for data processing provided by embodiments of the present disclosure may be applied to data query for big data, such as massive storage of log data etc. Here, data, for example, include test data produced during software test or also may include monitoring data in actual production etc. Source of the data may be specifically determined depending on actual application scenarios.

When data are to be stored, a different storage system is usually determined according to the query mode in the prior art. Specifically, the query mode includes online query and offline query. For online query, data may be stored using databases like RocksDB and LevelDB; while for offline query, data may be processed into a key-value form and stored in a Distributed File System (HDFS). In the embodiments of the present disclosure, the HDFS is selected as the common database for online query and offline query. That is, the HDFS is the data file system to be used below.

The method for data processing provided by embodiments of the present disclosure is to be explained below.

With reference to FIG. 1, a flowchart of a method for data processing provided by embodiments of the present disclosure is illustrated. The method comprises steps S101-S103, wherein:

S101: receiving a query instruction for data to be queried stored in a data file system;

S102: in response to the query instruction indicating an online query for the data to be queried, determining index information corresponding to the data to be queried and querying, based on the index information, the data to be queried in the data file system;

S103: in response to the query instruction indicating an offline query for the data to be queried, determining, based on keywords of the data to be queried, address information of the data to be queried in the data file system and querying, based on the address information, the data to be queried in the data file system.

The above S101-S103 are to be described in details below.

First of all, as an example, a possible application scenario of the method for data processing is provided in the embodiments of the present disclosure. In this application scenario, the data to be queried are log data produced in a software test, wherein new log data are possibly generated at every second and will be updated to the data file system regularly. The details may refer to the following description and will not be covered here.

For the above S101, a query instruction, for example, may be an instruction sent by user equipment. In a possible situation, the user may query the data in the data file system through user equipment, wherein data expected to be queried in the data file system are referred to as data to be queried. While determining the data to be queried, the user equipment may send a query instruction to a computer device to enable the computer device to apply the method for data processing provided by embodiments of the present disclosure. In accordance with the received query quality, it is determined to conduct an online query or an offline query for the data to be queried.

Specifically, the data to be queried are stored in the data file system, e.g., HDFS. The data file system may support multi-copy backup of the file to reduce data loss. Besides, data stored therein may be saved in key-value pair file format (Sequence File), such that the stored data to be queried may be queried by key-value pairs under the online query mode. For data in the data file system, dynamic partition and multilevel partition are also enabled, so as to implement automatic data partitioning in accordance with preset time nodes and task nodes. The newly generated data may be sequentially stored under the file by nodes. Moreover, on account of the limited data bearing capacity of the data file system, the data file system also supports automatically processing for stale data. For example, Time To Live (TTL) is set for the data, to clear the data that are farther from the current time in time sequence and ensure that the recently generated data may be normally stored in the data file system.

Depending on the actual situations, it is determined whether the query instruction indicates an online query or an offline query for the data to be queried. In a possible case, when the query instruction is sent, the query operation mode may be correspondingly determined for the query instruction in response to a select operation for online query or offline query. Therefore, after receiving the query instruction, the computer device may directly determine whether an online or offline query is to be performed.

In another possible situation, the principle for the online query and the offline query is different. The online query mode may directly query the data file system, while the offline query depends on an offline data table of the data file system. To determine the offline data table, data analysis should be performed, which costs a certain amount of time. As such, when querying the recent data in an adjacent period, the user may have to wait. Thus, if the query instruction indicates a query for recent data in an adjacent period, the online query mode may be determined for data query. However, in other scenarios, the offline query mode may also be determined for data query in view of the actual needs. For example, if it is expected to obtain the data within a given period of time to form a data report, the offline query mode may be adopted since the data query may be easily performed in batches through the offline data table.

The case where the query instruction indicates an online query mode for the data to be queried and the case where the query instruction indicates an offline query mode for the data to be queried are to be introduced below separately.

For the above S102, when the query instruction indicates an online query for the data to be queried, index information corresponding to the data to be queried may be determined and the data to be queried are queried in the data file system based on the index information.

In specific implementations, to determine index information corresponding to the data to be queried, index information corresponding to the data to be queried may be determined in a data index base corresponding to the data file system based on keywords of the data to be queried.

Wherein the data index base includes index information of the data to be queried, the index information of the data to be queried includes keywords of the data to be queried, and address information of the data to be queried in the data file system.

In a possible situation, the index information may be stored in the data index base in LSM-Tree (Log-Structured-Merge-Tree) data storage structure, wherein the index information for example may be represented in key-value pair form. Taking the data to be queried as example, when the index information is represented in key-value pair, the key in the key-value pair corresponds to keyword of the data to be queried and the value in the key-value pair corresponds to address information of the data to be queried in the data file system.

Next, the keyword corresponding to the data to be queried and the address information corresponding to the data to be queried in the data file system are to be explained respectively below.

The keyword of the data to be queried, for example, may include at least one of: object information, type information, corresponding query scope under the type information and data identifier corresponding to the data to be queried, wherein the keyword of the data to be queried is determined when the data to be queried is stored into the data file system after being generated.

As an example, the data to be queried includes log data generated in a software test. The data to be queried for example may include data generated at a certain moment within a process. In such case, the object information corresponding to the data to be queried may be associated with the process. If the process is a debugging process of the software test, the corresponding object information may be determined as debugging log when the data to be queried are stored into the data file system. The type information corresponding to the data to be queried may specifically indicate the query type. For instance, for the data to be queried, if the data to be queried are data generated at a given moment, the determined type information may be time. After the type information is determined, a corresponding query scope under the query information may be decided. For example, for the data to be queried, the moment when the data to be queried is produced may be considered as a corresponding query scope under the type information of "time", i.e., the data at a specific moment are queried. Data identity corresponding to the data to be queried may be used to ensure uniqueness of the data.

Figure 2:
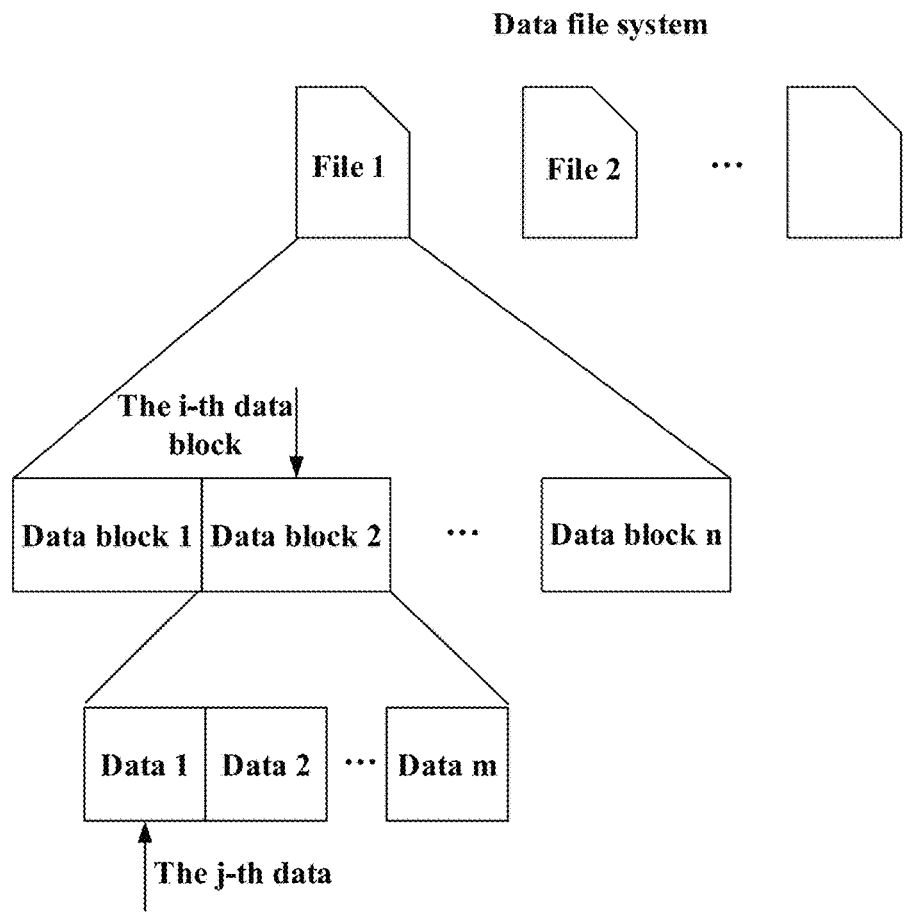
FIG. 2 illustrates a schematic diagram of a data file system during data storage provided by embodiments of the present disclosure.

The address information of the data to be queried may be determined in accordance with the mode employed by the data file system for data storage. As an example, FIG. 2 illustrates a schematic diagram of a data file system provided by embodiments of the present disclosure for data storage, wherein part of the data displayed is denoted specifically by data 1, data 2 . . . data m. The m data, when being stored, may be placed into the same data block for compression storage. Specifically, the data may be stored according to their corresponding keywords. For example, the data having same corresponding object information are placed in the same data block. Alternatively, the data may be further sequentially compressed and stored into the data block by type information. For instance, under the same type information, time segments are divided by time (i.e., time segment). Each hour may be determined as one segment and the data are then sequentially compressed and stored into a data block under the corresponding time segment in accordance with the time when the data are generated.

Here, for the data block into which the data are compressed and stored, position corresponding to each data stored therein may be determined and denoted by j-th data in the data block. For instance, for data 1 shown in FIG. 2, its position in the data block represents the first data.

Likewise, for the data block resulted from compression storage of data, it may be sequentially stored into the data file system in accordance with the data produced by the data block. Accordingly, the storage position corresponding to each data block may also be determined in the data file system, and may be denoted by the i-th data block in the data file system as an example. For instance, the data block 2 shown in FIG. 2 is the second data block in the data file system.

In one possible situation, the data file system also may include a plurality of files, such as file 1 and file 2 shown in FIG. 2. When any one file is determined, a corresponding storage path, which is known as file path in the embodiments of the present disclosure, is also determined. In accordance with the above description, the data are stored in the data block, and the data block is further stored in the data file system. Therefore, the address information of the data may be determined in accordance with file path, data block under the file path and data storage position under the data block. As an example, a corresponding storage position of data 1 is the first data in the second data block under the file path corresponding to file 1.

Therefore, the keyword and the address information included in the index information of the data to be queried may be determined.

In specific implementations, the data file system also contains other data besides the data to be queried, the other data being referred to as storage data in the embodiments of the present disclosure. Each storage data also has corresponding index information. However, the data file system contains a large amount of storage data, so the corresponding index information is also huge. In such case, the large amount of index information stored in the data index base is also inconvenient for storage. Meanwhile, when the index information is determined from the data index base through the keyword of the data to be queried, a significant amount of search is to be done, making it more difficult to search.

Because of the relatively high degree of information aggregation of the data index base, the index information may also be merged. Specifically, the index information may be merged by groups.

In a specific implementation, before index information corresponding to the data to be queried is determined from the data index base based on keywords of the data to be queried, the index information may be grouped and the data index base is updated based on a obtained plurality of index information groups. Thus, when the index information corresponding to the data to be queried is determined from the data index base based on keywords of the data to be queried, a target index information group may be determined from the plurality of index information groups based on the keywords and an index position of index information corresponding to the data to be queried in the target index information group is also determined; and index information of the data to be queried is determined from the index information group based on the index position.

Wherein, a specific approach of obtaining the index information group by grouping a plurality of pieces of the index information is described in the first place. In a specific implementation, grouping keywords may be determined for the index information groups; target index information is determined from a plurality of pieces of the index information based on the grouping keywords; wherein the grouping keywords include keywords of the target index information; the target index information is grouped to obtain the index information groups.

Wherein the grouping keywords may be determined in accordance with keywords corresponding to a plurality of pieces of index information in the data index base. As an example, the index information may be grouped based on the object information included in the keywords. For example, index information having debugging log as the corresponding object information may be classified into one group. Alternatively, the index information may be further grouped in accordance with the type information contained in the keyword and the query scope under the type information. For instance, the index information corresponding to a given period of time may be classified into one group. Here, the determined group is the grouping keyword. With the grouping keyword, the target index information belonging to the grouping keyword may be determined in the index information. The target index information of respective groups may be grouped to obtain an index information groups.

For the index information groups, the keyword resulted from grouping and merging, for example, may include a version number and a grouping keyword. The version number here may be compatibly used for the possible data structure update in the future. However, the address information resulted from grouping and merging may be determined based on the first storage position in a plurality of storage data and storage offset related to the plurality of storage data.

In this way, after the index information is grouped into index information groups, the keywords for grouping may be stored as category of the index information group, and not every index information is occupying the storage space for storing the corresponding keywords under respective category. The footprint on the storage space of the data index base can be effectively reduced. Further, the keywords for grouping also may play a role similar to "catalog". Therefore, when the index information is further determined using the index information group, the storage position of the index information can be more rapidly located and the corresponding index information is obtained. The data processing efficiency may also be improved through storing the index information by groups.

Afterwards, the specific way for determining index information corresponding to the data to be queried in an updated data index base is explained. In a specific implementation, corresponding target index information may be determined in a data index base using keywords corresponding to the data to be queried. When the target index information is determined, an index position of the index information may be determined in the target index information. In one possible situation, if data are stored by time, the index position of the index information may be determined in the target index information group according to time sequence. As such, when the target index information group and the index position are determined, the index information of the data to be queried may be determined in the target index information.

After the index information of the data to be queried is determined, the data to be queried may be queried in the data file system based on the address information in the index information. Specifically, if the data to be queried is stored in the data file system, the address information of the data to be queried may also be determined, e.g., a relative storage position of the data to be queried in the target data block of the data file system. The target data block is positioned under a target file path in the data file system. Hence, with the index information and based on the address information, the data to be queried can be rapidly found under a storage path indicated by the address information.

As to the above S103, in case that the query instruction indicating an offline query for the data to be queried, keywords of the data to be queried may be determined and address information of the data to be queried in the data file system is also determined and the data to be queried is queried in the data file system based on the address information.

In a detailed implementation, when address information of the data to be queried is determined in the data file system based on keywords of the data to be queried, address information of the data to be queried may be determined in an offline data table corresponding to the data file system based on keywords of the data to be queried.

Here, the offline data table for example is hive table. The offline data table includes keywords corresponding to the data to be queried, and address information of the data to be queried in the data file system. The hive table is periodically updated along with the constant storage of data, wherein the hive table for example is a data table generated after data analysis of the storage data. After the keywords of the data to be queried are determined, the address information of the data to be queried may be correspondingly found in the hive table. Therefore, the data to be queried also can be directly found in the data file system in accordance with the address information.

The present disclosure provides a method, an apparatus, a computer device and a storage medium for data processing. A same data file system for data storage is used by online query and offline query. To adapt online query and offline query to the same data file system, the query may be made in accordance with different information of the data to be queried under different query modes. For example, when the data to be queried is queried by an online query approach, the data to be queried is queried in the data file system by its corresponding index information; alternatively, if the data to be queried is queried by an offline query approach, address information of the data to be queried in the data file system is determined based on keywords of the data to be queried for query. Accordingly, as the online and offline query approaches adopt the same data file system, consistency between the results obtained under the two query modes is ensured, which further guarantees data query accuracy.

Those skilled in the art may appreciate that although the respective steps are drafted in a given order in the above method of the specific implementations, it does not mean the steps should be strictly executed in such order. Instead the drafting order makes no limitations over the implementation process. The specific execution order of the respective steps should be determined by their functions and possible internal logic.

On the basis of the same inventive concept, embodiments of the present disclosure also provide an apparatus for data processing corresponding to the method for data processing. Because the principle followed by the apparatus in the embodiments of the present disclosure is similar to the above method for data processing according to the embodiments of the present disclosure, the implementation of the apparatus may refer to how the method is implemented and the same contents will not be covered here.

Figure 3:
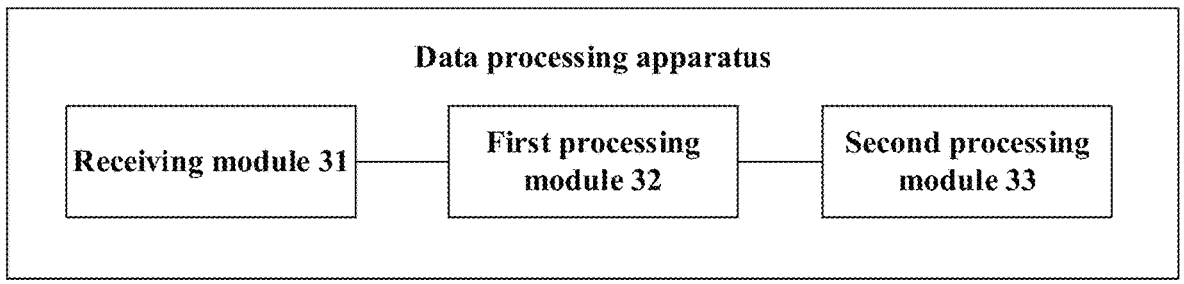
FIG. 3 illustrates a schematic diagram of an apparatus for data processing provided by embodiments of the present disclosure.

FIG. 3 illustrates a schematic diagram of an apparatus for data processing provided by embodiments of the present disclosure. The apparatus comprises: a receiving module 31, a first processing module 32 and a second processing module 33; wherein, a receiving module 31 for receiving a query instruction for data to be queried stored in a data file system;

a first processing module 32 for in response to the query instruction indicating an online query for the data to be queried, determining index information corresponding to the data to be queried and querying, based on the index information, the data to be queried in the data file system;

a second processing module 33 for in response to the query instruction indicating an offline query for the data to be queried, determining, based on keywords of the data to be queried, address information of the data to be queried in the data file system and querying, based on the address information, the data to be queried in the data file system.

In one optional implementation, when determining, based on keywords of the data to be queried, address information of the data to be queried in the data file system, the second processing module 33 is used for: determining, based on the keywords of the data to be queried, address information of the data to be queried in an offline data table corresponding top the data file system; the offline data table includes the keywords corresponding to the data to be queried, and the address information of the data to be queried in the data file system.

In an optional implementation, when determining index information corresponding to the data to be queried, the first processing module 32 is used for: determining, based on keywords of the data to be queried, index information corresponding to the data to be queried in a data index base corresponding to the data file system; wherein the data index base includes index information of the data to be queried, the index information of the data to be queried includes keywords of the data to be queried, and address information of the data to be queried in the data file system.

In an optional implementation, the data file system includes a plurality of storage data containing the data to be queried and each of the storage data has corresponding index information; before determining, based on keywords of the data to be queried, index information corresponding to the data to be queried in the data index base, the first processing module 32 is also used for: grouping a plurality of pieces of the index information and updating, based on a plurality of index information groups obtained, the data index base; wherein when determining, based on keywords of the data to be queried, index information corresponding to the data to be queried in the data index base, the first processing module 32 is used for: determining, based on the keywords, a target index information group from the plurality of index information groups and an index position of index information corresponding to the data to be queried in the target index information group; determining, based on the index position, index information of the data to be queried from the index information group.

In an optional implementation, when obtaining the index information group by grouping a plurality of pieces of the index information, the first processing module 32 is used for: determining grouping keywords for the index information group; determining, based on the grouping keywords, target index information from a plurality of pieces of the index information; wherein the grouping keywords include keywords of the target index information; grouping the target index information to obtain the index information group.

In an optional implementation, when querying, based on the index information, the data to be queried in the data file system, the first processing module 32 is used for: querying, based on address information in the index information, the data to be queried in the data file system; the address information characterizes a relative storage position of the data to be queried in a target data block of the data file system, the target data block being located under a target file path in the data file system.

In an optional implementation, the keywords include at least one of: object information, type information, corresponding query scope under the type information and data identifier. corresponding to the data to be queried, The processing procedure of respective modules in the apparatus and interactive process between the respective modules may refer to the related description in the above method embodiments and will not be covered here.

Figure 4:
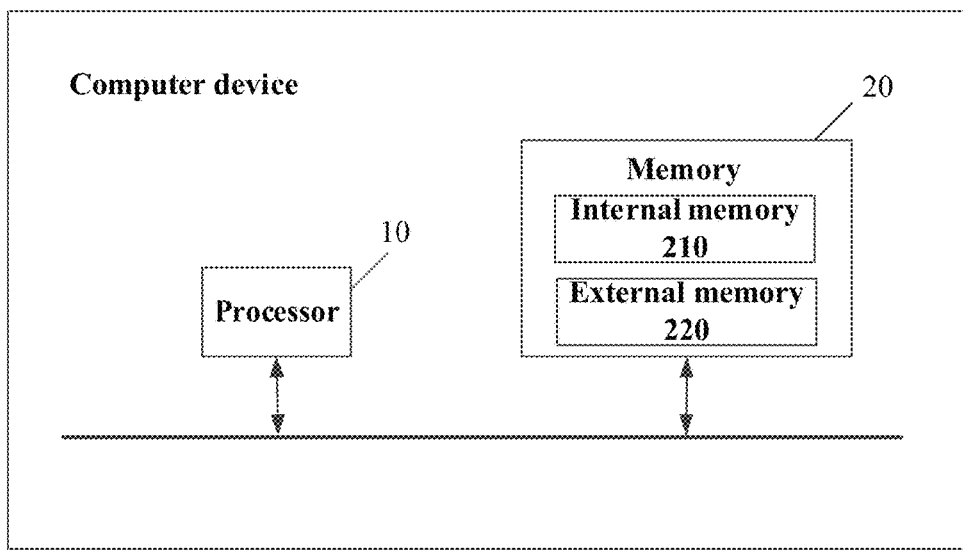
FIG. 4 illustrates a schematic diagram of a computer device provided by embodiments of the present disclosure.

Embodiments of the present disclosure also provide a computer device. FIG. 4 illustrates a structural diagram of the computer device provided by embodiments of the present disclosure, comprising:

A processor 10 and a memory 20 stored with machine-readable instructions executable by the processor 10; where the processor 10 executes machine-readable instructions stored in the memory 20; the machine-readable instructions, when executed by the processor 10, perform steps of:

receiving a query instruction for data to be queried stored in a data file system; in response to the query instruction indicating an online query for the data to be queried, determining index information corresponding to the data to be queried and querying, based on the index information, the data to be queried in the data file system; in response to the query instruction indicating an offline query for the data to be queried, determining, based on keywords of the data to be queried, address information of the data to be queried in the data file system and querying, based on the address information, the data to be queried in the data file system.

The above memory 20 consists of an internal memory 210 and an external memory 220; the internal memory 210 here is used for temporarily storing the operational data in the processor 10 and data exchanged with the external memory 220 (such as hard disk and the like). The processor 10 exchanges data with the external memory 220 through the internal memory 210.

Detailed execution of the above instructions may refer to steps of the method for data processing in the embodiments of the present disclosure and will not be covered here.

Embodiments of the present disclosure also provide a computer-readable storage medium stored thereon with computer programs, wherein the computer programs, when operated by the processor, perform steps of the method for data processing in the above method embodiments. The storage medium may be volatile or non-volatile computer-readable storage medium.

Embodiments of the present disclosure further provide a computer program product carrying program codes; instructions included in the program codes may perform steps of the method for data processing in the above method embodiments. The details may refer to the above method embodiments and will not be elaborated here.

Wherein the above computer program product may be implemented by hardware, software or combinations thereof. In one optional embodiment, the computer program product is specifically embodied as computer storage medium. In a further alternative embodiment, the computer program product is specifically embodied as software product (e.g., Software Development Kit, SDK).

It may be clearly understood by those skilled in the art that, for sake of an easy and concise description, a detailed working process of the above described system and apparatus may refer to a corresponding process in the foregoing method embodiments. Details are not described herein again. In the several embodiments provided by the present disclosure, it should be understood that the disclosed system, apparatus and method may be implemented in other manners. The above described apparatus embodiment is merely an example. For example, the unit division is merely a division by logic function and there may be other dividing approaches in actual implementation. For another example, a plurality of units or components may be combined, or integrated into a further system. Alternatively, some features may be ignored or not performed. In addition, the displayed or discussed mutual couplings or direct couplings or communication links may be implemented through some interfaces. The indirect couplings or communication links between the apparatuses or units may be implemented in electrical, mechanical, or other forms.

The units described as discrete parts may or may not be physically separated, and parts displayed as units may or may not be physical units, i.e., they may be located at one position, or may be distributed over a plurality of network units. Some or all of the units may be selected based on actual requirements to fulfill the objectives of the solutions of the embodiments.

In addition, functional units in respective embodiments of the present disclosure may be integrated into one processing unit, or exist alone physically; alternatively, two or more units may be integrated into one unit.

The functions, when implemented in the form of software functional unit and sold or used as an independent product, may be stored in a non-volatile computer-readable storage medium executable by the processor. Based on such understanding, the technical solutions of the present disclosure essentially, or the part of the technical solutions contributing to the prior art, or some of the technical solutions may be implemented in the form of software product. The computer software product is stored in a storage medium, and includes several instructions for enabling a computer device (which may be a personal computer, a server, a network device, or the like) to perform all or some of the steps of the methods described in the embodiments of the present disclosure. The foregoing storage medium includes any medium that can store program codes, such as USB flash drive, mobile hard disk, Read-Only Memory (ROM), Random Access Memory (RAM), magnetic disk, or optical disc.

In the end, it should be noted that the above embodiments are merely specific implementations of the present disclosure and intended to explain the technical solutions of the present disclosure, rather than restricting them. The protection scope of the present disclosure is not restricted to this. Although the present disclosure is described in details with reference to the foregoing embodiments, those ordinary skilled in the art should understand that any technical personnel familiar with the technical field can still modify the technical solutions disclosed by the above embodiments or easily conceive of the changes of these technical solutions or equivalently substitute some of the technical features therein within the technical scope disclosed by the present disclosure. However, these modifications, changes or substitutions would not deviate the corresponding technical solutions from the spirit and scope of the technical solutions according to the embodiments of the present disclosure and instead should be encompassed within the protection scope of the present disclosure. Therefore, the protection scope of the present disclosure should be subject to the protection scope of the claim.

We claim:

1. A method for data processing, comprising:
   receiving a query instruction for data to be queried stored in a data file system, wherein the data file system is a common database storing data for online queries and offline queries;

determining whether the query instruction indicates an online query or an office query;

in response to the query instruction indicating the online query, determining index information corresponding to the data to be queried and querying, based on the index information, the data to be queried in the data file system, wherein the index information is represented in a key-value pair, a key in the key-value pair corresponds to a keyword of the data to be queried, and the value in the key-value pair corresponds to address information of the data to be queried in the data file system; and in response to the query instruction indicating the offline query, determining, based on keywords of the data to be queried and a hive table, address information of the data to be queried in the data file system and querying, based on the address information, the data to be queried in the data file system, wherein the hive table comprises the keywords corresponding to the data to be queried and address information of the data to be queried in the data file system.

2. The method of claim 1, wherein determining, based on keywords of the data to be queried, address information of the data to be queried in the data file system comprises:

determining, based on the keywords of the data to be queried, address information of the data to be queried in an offline data table corresponding top the data file system; and the offline data table includes the keywords corresponding to the data to be queried, and the address information of the data to be queried in the data file system.

3. The method of claim 1, wherein determining index information corresponding to the data to be queried comprises:

determining, based on the keywords of the data to be queried, index information corresponding to the data to be queried in a data index base corresponding to the data file system, wherein the data index base includes the index information of the data to be queried, the index information of the data to be queried includes the keywords of the data to be queried, and address information of the data to be queried in the data file system.

4. The method of claim 3, wherein the data file system includes a plurality of storage data containing the data to be queried and each of the storage data has corresponding index information;

before determining, based on the keywords of the data to be queried, the index information corresponding to the data to be queried in the data index base, the method also comprises:

grouping a plurality of pieces of the index information and updating, based on a plurality of pieces of the index information groups obtained, the data index base; and wherein determining, based on the keywords of the data to be queried, the index information corresponding to the data to be queried in the data index base comprises:

determining, based on the keywords, a target index information group from the plurality of pieces of index information groups and an index position of the index information corresponding to the data to be queried in the target index information group; and determining, based on the index position, the index information of the data to be queried from the index information group.

5. The method of claim 4, wherein obtaining the index information groups by grouping a plurality of pieces of the index information comprises:

determining grouping keywords for the index information groups;

determining, based on the grouping keywords, target index information from a plurality of pieces of the index information, wherein the grouping keywords include keywords of the target index information; and grouping the target index information to obtain the index information groups.

6. The method of claim 1, wherein querying, based on the index information, the data to be queried in the data file system comprises:

querying, based on address information in the index information, the data to be queried in the data file system; and the address information represents a relative storage position of the data to be queried in a target data block of the data file system, the target data block being located under a target file path in the data file system.

7. The method of claim 1, wherein the keywords include at least one of: object information, type information, corresponding query scope under the type information and a data identifier corresponding to the data to be queried.

8. A computer device, comprising: a processor and a memory stored with machine-readable instructions executable by the processor; wherein the machine-readable instructions, when executed by the processor, cause the processor to perform a method comprising:

receiving a query instruction for data to be queried stored in a data file system, wherein the data file system is a common database storing data for online queries and offline queries;

determining whether the query instruction indicates an online query or an office query;

in response to the query instruction indicating the online query, determining index information corresponding to the data to be queried and querying, based on the index information, the data to be queried in the data file system, wherein the index information is represented in a key-value pair, a key in the key-value pair corresponds to a keyword of the data to be queried, and the value in the key-value pair corresponds to address information of the data to be queried in the data file system; and in response to the query instruction indicating the offline query, determining, based on keywords of the data to be queried and a hive table, address information of the data to be queried in the data file system and querying, based on the address information, the data to be queried in the data file system, wherein the hive table comprises the keywords corresponding to the data to be queried and address information of the data to be queried in the data file system.

9. A non-transitory computer-readable storage medium stored thereon with computer programs which, when operated by a computer device, cause the computer device to perform a method comprising receiving a query instruction for data to be queried stored in a data file system, wherein the data file system is a common database storing data for online queries and offline queries;

determining whether the query instruction indicates an online query or an office query;

in response to the query instruction indicating the online query, determining index information corresponding to the data to be queried and querying, based on the index information, the data to be queried in the data file system, wherein the index information is represented in a key-value pair, a key in the key-value pair corresponds to a keyword of the data to be queried, and the value in the key-value pair corresponds to address information of the data to be queried in the data file system; and in response to the query instruction indicating the offline query, determining, based on keywords of the data to be queried and a hive table, address information of the data to be queried in the data file system and querying, based on the address information, the data to be queried in the data file system, wherein the hive table comprises the keywords corresponding to the data to be queried and address information of the data to be queried in the data file system.

10. The computer device of claim 8, wherein determining, based on keywords of the data to be queried, address information of the data to be queried in the data file system comprises:

determining, based on the keywords of the data to be queried, address information of the data to be queried in an offline data table corresponding top the data file system; and the offline data table includes the keywords corresponding to the data to be queried, and the address information of the data to be queried in the data file system.

11. The computer device of claim 8, wherein determining index information corresponding to the data to be queried comprises:

determining, based on the keywords of the data to be queried, index information corresponding to the data to be queried in a data index base corresponding to the data file system, wherein the data index base includes the index information of the data to be queried, the index information of the data to be queried includes the keywords of the data to be queried, and address information of the data to be queried in the data file system.

12. The computer device of claim 11, wherein the data file system includes a plurality of storage data containing the data to be queried and each of the storage data has corresponding index information;

before determining, based on the keywords of the data to be queried, the index information corresponding to the data to be queried in the data index base, the method also comprises:

grouping a plurality of pieces of the index information and updating, based on a plurality of pieces of the index information groups obtained, the data index base; and wherein determining, based on the keywords of the data to be queried, the index information corresponding to the data to be queried in the data index base comprises:

determining, based on the keywords, a target index information group from the plurality of pieces of index information groups and an index position of the index information corresponding to the data to be queried in the target index information group; and determining, based on the index position, the index information of the data to be queried from the index information group.

13. The computer device of claim 12, wherein obtaining the index information groups by grouping a plurality of pieces of the index information comprises:

determining grouping keywords for the index information groups;

determining, based on the grouping keywords, target index information from a plurality of pieces of the index information, wherein the grouping keywords include keywords of the target index information; and grouping the target index information to obtain the index information groups.

14. The computer device of claim 8, wherein querying, based on the index information, the data to be queried in the data file system comprises:

querying, based on address information in the index information, the data to be queried in the data file system; and the address information represents a relative storage position of the data to be queried in a target data block of the data file system, the target data block being located under a target file path in the data file system.

15. The computer device of claim 8, wherein the keywords include at least one of: object information, type information, corresponding query scope under the type information and a data identifier corresponding to the data to be queried.

16. The non-transitory computer-readable storage medium of claim 9, wherein determining, based on keywords of the data to be queried, address information of the data to be queried in the data file system comprises:

determining, based on the keywords of the data to be queried, address information of the data to be queried in an offline data table corresponding top the data file system; and the offline data table includes the keywords corresponding to the data to be queried, and the address information of the data to be queried in the data file system.

17. The non-transitory computer-readable storage medium of claim 9, wherein determining index information corresponding to the data to be queried comprises:

determining, based on the keywords of the data to be queried, index information corresponding to the data to be queried in a data index base corresponding to the data file system, wherein the data index base includes the index information of the data to be queried, the index information of the data to be queried includes the keywords of the data to be queried, and address information of the data to be queried in the data file system.

18. The non-transitory computer-readable storage medium of claim 17, wherein the data file system includes a plurality of storage data containing the data to be queried and each of the storage data has corresponding index information;

before determining, based on the keywords of the data to be queried, the index information corresponding to the data to be queried in the data index base, the method also comprises:

grouping a plurality of pieces of the index information and updating, based on a plurality of pieces of the index information groups obtained, the data index base; and wherein determining, based on the keywords of the data to be queried, the index information corresponding to the data to be queried in the data index base comprises:

determining, based on the keywords, a target index information group from the plurality of pieces of index information groups and an index position of the index information corresponding to the data to be queried in the target index information group; and determining, based on the index position, the index information of the data to be queried from the index information group.

19. The non-transitory computer-readable storage medium of claim 18, wherein obtaining the index information groups by grouping a plurality of pieces of the index information comprises:
  determining grouping keywords for the index information groups;
  determining, based on the grouping keywords, target index information from a plurality of pieces of the index information, wherein the grouping keywords include keywords of the target index information; and
  grouping the target index information to obtain the index information groups.

20. The non-transitory computer-readable storage medium of claim 9, wherein querying, based on the index information, the data to be queried in the data file system comprises:
  querying, based on address information in the index information, the data to be queried in the data file system; and
  the address information represents a relative storage position of the data to be queried in a target data block of the data file system, the target data block being located under a target file path in the data file system.

\* \* \* \* \*